(12) United States Patent
Niwa et al.

(10) Patent No.: US 7,970,173 B2
(45) Date of Patent: Jun. 28, 2011

(54) OBJECT-DETECTING DEVICE AND METHOD OF EXTRACTING OPERATION OBJECT

(75) Inventors: Shinji Niwa, Nagoya (JP); Isao Aichi, Toyota (JP); Masayuki Takami, Hamamatsu (JP)

(73) Assignee: Denso Corporation, Kariya (JP)

( * ) Notice: Subject to any disclaimer, the term of this patent is extended or adjusted under 35 U.S.C. 154(b) by 1125 days.

(21) Appl. No.: 11/727,991

(22) Filed: Mar. 29, 2007

(65) Prior Publication Data

US 2007/0230929 A1  Oct. 4, 2007

(30) Foreign Application Priority Data

Mar. 31, 2006  (JP) ................. 2006-097923

(51) Int. Cl.
*G06K 9/00* (2006.01)
*G03B 29/00* (2006.01)
(52) U.S. Cl. .......................................... 382/103; 396/15
(58) Field of Classification Search .................. 382/103, 382/104, 107, 125, 190, 198; 348/154, 155, 348/169–172, 258, 269, 340, 342, 370; 340/438; 345/173, 204, 205; 396/15; 701/1, 36, 53, 701/93, 96; 715/700, 716, 722
See application file for complete search history.

(56) References Cited

U.S. PATENT DOCUMENTS

| | | | |
|---|---|---|---|
| 6,407,733 B1 * | 6/2002 | Kawakami | 345/204 |
| 6,628,335 B1 * | 9/2003 | Numazaki et al. | 348/370 |
| 6,714,247 B1 * | 3/2004 | Numazaki et al. | 348/370 |
| 2005/0238202 A1 | 10/2005 | Sato et al. | |
| 2006/0044282 A1 | 3/2006 | Pinhanez et al. | |

FOREIGN PATENT DOCUMENTS

| | | |
|---|---|---|
| DE | 199 18 633 | 11/2000 |
| DE | 102 33 233 | 2/2004 |
| JP | A-6-84081 | 3/1994 |
| JP | A-7-271982 | 10/1995 |
| JP | A-9-81307 | 3/1997 |
| JP | A-2000-6687 | 1/2000 |
| JP | A-2000-75991 | 3/2000 |
| JP | A-2000-506632 | 5/2000 |
| JP | A-2001-159954 | 6/2001 |
| JP | A-2001-350576 | 12/2001 |
| JP | A-2002-236534 | 8/2002 |
| JP | A-2003-104122 | 4/2003 |

(Continued)

OTHER PUBLICATIONS

Office Action dated Oct. 8, 2008 in corresponding German patent application No. 10 2007 015 495.1-53 (and English translation).

(Continued)

*Primary Examiner* — Abolfazl Tabatabai
(74) *Attorney, Agent, or Firm* — Posz Law Group, PLC

(57) ABSTRACT

An object-detecting device detects an operation object for operating an operating apparatus. The object-detecting device includes an imaging portion for imaging the operation object and an image processor for extracting the operation object. The operation object has a first face, on which outside light falls from outside into the operating apparatus, and a second face opposite to the first face. The imaging portion images the second face of the operation object. The object-detecting device can stably detect the operation object, even when an illuminance variation of outside light is large.

11 Claims, 6 Drawing Sheets

FOREIGN PATENT DOCUMENTS

| | | |
|---|---|---|
| JP | A-2004-26046 | 1/2004 |
| JP | A-2004-168264 | 6/2004 |
| JP | 2005-63107 A | 3/2005 |
| JP | A-2005-63090 | 3/2005 |
| WO | WO 2006/013783 A1 | 2/2006 |

OTHER PUBLICATIONS

Notice of Reason for Refusal mailed on Apr. 13, 2010 issued from the Japanese Patent Office in the corresponding Japanese patent application No. 2006-097923 (with English translation).

* cited by examiner

LIGHT-ON IMAGE − LIGHT-OFF IMAGE = DIFFERENTIAL IMAGE

LIGHT-ON IMAGE − LIGHT-OFF IMAGE = DIFFERENTIAL IMAGE

OBJECT-DETECTING DEVICE AND METHOD OF EXTRACTING OPERATION OBJECT

CROSS REFERENCE TO RELATED APPLICATION

This application is based on Japanese Patent Application No. 2006-97923 filed on Mar. 31, 2006, the disclosure of which is incorporated herein by reference.

FIELD OF THE INVENTION

The present invention relates to an object-detecting device and a method of extracting an operation object.

BACKGROUND OF THE INVENTION

JP-A-2000-6687 discloses a safety operation system. When a driver operates an apparatus, e.g., vehicle navigation device, in a vehicle, the system extracts an operation object, e.g., finger of the driver or touch pen, by using an image processing. The extracted operation object is displayed on a display screen, and overlaps with other images on the display screen. Thus, the driver can safely operate the apparatus, because the driver can see the operation object on the display screen in front of the driver.

JP-A-6-84081 discloses a method of extracting the operation object using a chromakey image. In the method, a color gain of a video signal is variable. After the color gain of the video signal is controlled, the chromakey image having a predetermined color is extracted. Then, the extracted chromakey image is determined to have a predetermined shape or not. When the extracted chromakey image has the predetermined shape, the operation object can be extracted.

However, outside light passing through a window of the vehicle may change its brightness and color. Therefore, the operation object may not stably be detected, because the brightness and the color in the vehicle are changed by direct sunlight, shadow, or tunnel lighting, when a certain brightness and a certain color are used in the method. Further, in order to deal with an illuminance variation of outside light, a camera having a wide sensitivity range is used, or lens aperture is controlled in a wide range. Thus, cost of the safety operation system may be increased.

SUMMARY OF THE INVENTION

In view of the foregoing and other problems, it is an object of the present disclosure to provide an object-detecting device and a method of extracting an operation object for an operating apparatus such as a vehicle navigation system, a personal computer and so on.

According to a first aspect of the disclosure, an object-detecting device detects an operation object, which is used for operating an operating apparatus. The object-detecting device includes an imaging portion for imaging the operation object, and an image processor for extracting the operation object. The operation object has a first face, on which outside light falls from outside into the operating apparatus, and a second face opposite to the first face. The imaging portion images the second face of the operation object.

According to a second aspect of the disclosure, a method of extracting an operation object for operating an apparatus includes a first imaging step, a second imaging step and a comparing step. The operation object has a first face, on which outside light falls, and a second face opposite to the first face. In the first imaging step, a first image of the operation object is imaged, when a controller turns on a lighting portion to light the second face of the operation object. In the second imaging step, a second image of the operation object is imaged, when the controller turns off the lighting portion. In the comparing step, the first image and the second image are compared so as to extract the operation object.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

First Embodiment

Figure 1:
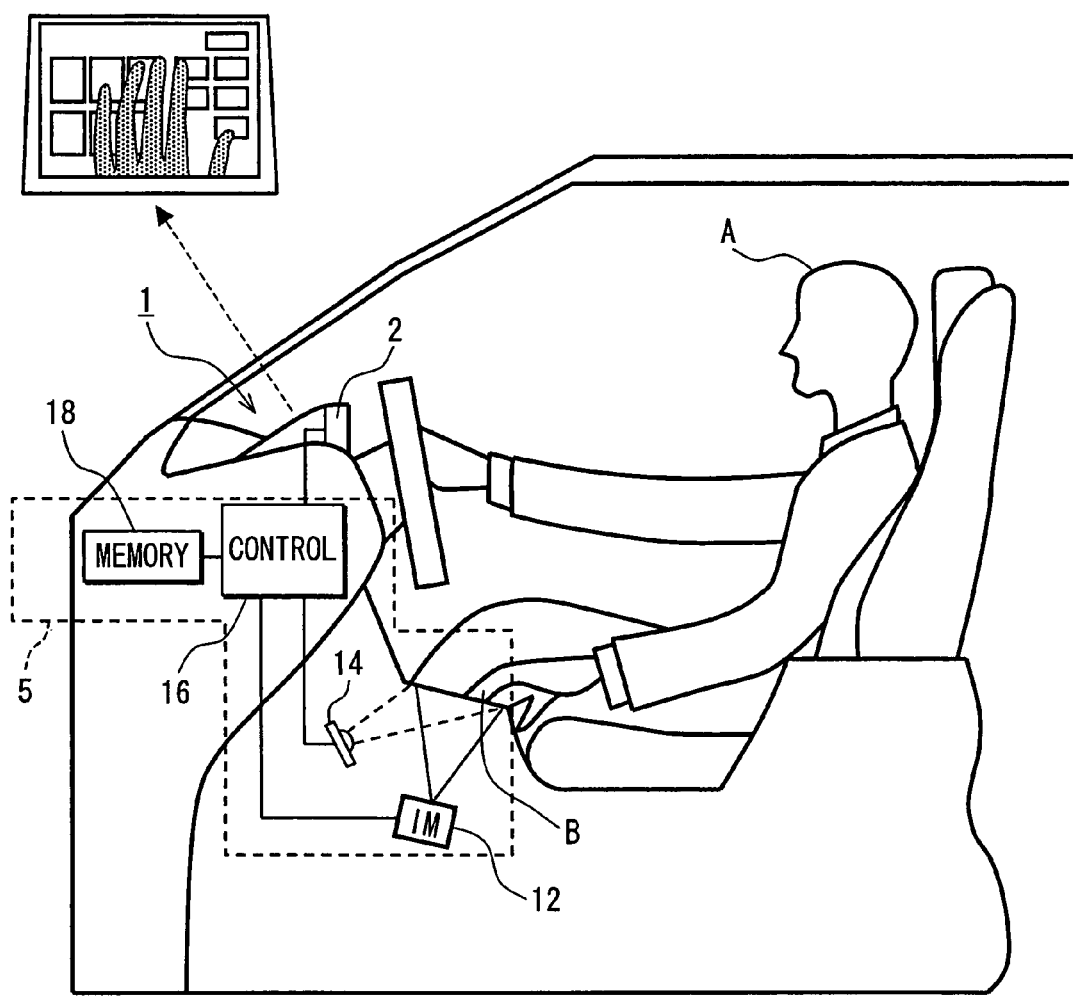
FIG. 1 is a schematic diagram showing an object-detecting device according to a first embodiment of the present invention.

As shown in FIG. 1, a vehicle navigation system 1 is mounted in a vehicle compartment, and includes a display screen 2 and an object-detecting device 5.

The display screen 2 displays information, e.g., a subject vehicle position on a map, or a road traffic information, for a driver A of the vehicle. The display screen 2 is made of liquid crystal, for example, and positioned at a front part of the compartment such that the driver A can easily look at the screen 2.

Figure 2:
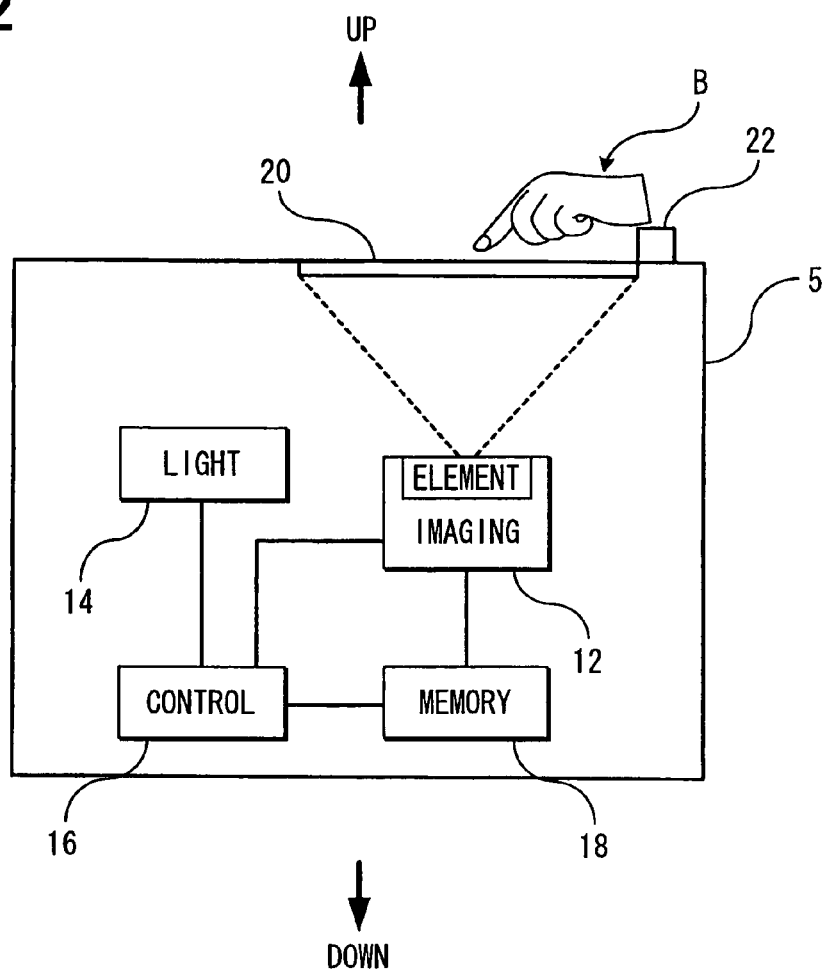
FIG. 2 is a schematic diagram showing a construction of the device.

The object-detecting device 5 extracts an external shape (outline) of a finger B (hand) of the driver A by using an image processing, when the driver A operates the vehicle navigation system 1. As shown in FIG. 2, the object-detecting device 5 includes an imaging portion 12, a lighting portion 14, a controller 16, an image memory 18 and an operation panel 20. An image processor is composed of the controller 16, the image memory 18 and the like.

The imaging portion 12 obtains an infrared image. Specifically, the imaging portion 12 includes a mirror for reflecting infrared light, a lens for collecting infrared light, a light wavelength conversion element for converting infrared light into visible light, and an imaging element (tube) for imaging a visible image. The light wavelength conversion element is made of a nonlinear optical material. The imaging element may be separated from optical parts such as the mirror or the lens.

The imaging portion 12 has a focus, which is spaced from a top face of the operation panel 20 toward the finger B (upside). Outside light falls on a top face of the finger B of the driver A. The imaging portion 12 is positioned at a bottom side of the finger B of the driver A so as to image the top face of the panel 20. Specifically, the imaging portion 12 is located at a bottom side of the operation panel 20. Alternatively, only the optical parts of the imaging portion 12 may be located at the bottom side of the finger B. In this case, the imaging portion 12 may not be located at the bottom side of the finger B.

The finger B has the top face, on which outside light falls, and a bottom face, on which outside light does not fall. A brightness change of the bottom face of the finger B is small, even when an illuminance of outside light changes.

The lighting portion 14 emits infrared light. For example, an infrared light-emitting diode (LED) is used for the lighting portion 14, and directly emits infrared rays. Alternatively, an illuminant, e.g., incandescent lamp, Nernst glow lamp, globe, arc-discharge tube or tungsten lamp, covered with an infrared rays transmittable filter may be used for the lighting portion 14. The lighting portion 14 is disposed in the device 5 such that infrared light is emitted to the finger B facing the operation panel 20. The lighting portion 14 controls the brightness of the bottom face of the finger B.

The image memory 18 stores images captured by the imaging portion 12. The imaging portion 12 captures a first image (light image), when the lighting portion 14 is lighting. The imaging portion 12 captures a second image (non-light image), when the lighting portion 14 is not lighting. The image memory 18 has a memory size, in which one or more first images and one or more second images can be stored.

The driver A touches the operation panel 20 by the finger B without looking at the operation panel 20, in order to operate the vehicle navigation system 1. For example, the driver A inputs a target destination into the operation panel 20, or the driver A changes a setting (e.g., display magnification) of the display screen 2 through the operation panel 20. The display magnification of the display screen 2 can be increased or reduced through the operation panel 20. The operation panel 20 is made of a material capable of transmitting infrared rays, e.g., acrylic board.

An operation object sensor 22 detects the finger B of the driver A, when the finger B is at an operation position. The operation position represents a position, at which the finger B can touch the operation panel 20. Specifically, the sensor 22 is made of a micro switch or pressure-sensitive sheet. The sensor 22 is adjacent to the operation panel 20. When the driver A touches the operation panel 20 by the finger B, the driver A pushes the sensor 22 by the palm or the wrist. The sensor 22 may be disposed on a palm rest. When the driver A touches the operation panel 20 by the finger B, the sensor 22 is turned on.

The controller 16 controls the imaging portion 12, the lighting portion 14 and the image memory 18, and is made of a CPU, a ROM, a RAM and an I/O (not shown). For example, the controller 16 controls a timing for imaging by the imaging portion 12, and an optical condition such as a lens aperture. The sensor 22 outputs a signal into the controller 16.

When the sensor 22 is turned on, that is when the driver A touches the operation panel 20 by the finger B, the controller 16 captures an image of the finger B, based on a differential image between the first image and the second image stored in the image memory 18.

More specifically, the controller 16 actuates the lighting portion 14, captures the first image from the imaging portion 12, and stores the first image into the image memory 18. Then, the controller 16 stops the lighting portion 14, captures the second image from the imaging portion 12, and stores the second image into the image memory 18. Thus, the controller 16 captures the image of the finger B based on the differential image between the first image and the second image.

Here, a principle for obtaining the image of the finger B based on the differential image will be described with reference to FIGS. 3 and 4. A first curve α represents a brightness of the finger B, when outside light and artificial light by the lighting portion 14 exist. A second curve β represents the brightness of the finger B, when only the outside light exists. A third curve γ represents the brightness of the finger B, when only the artificial light by the lighting portion 14 exists.

Figure 3:
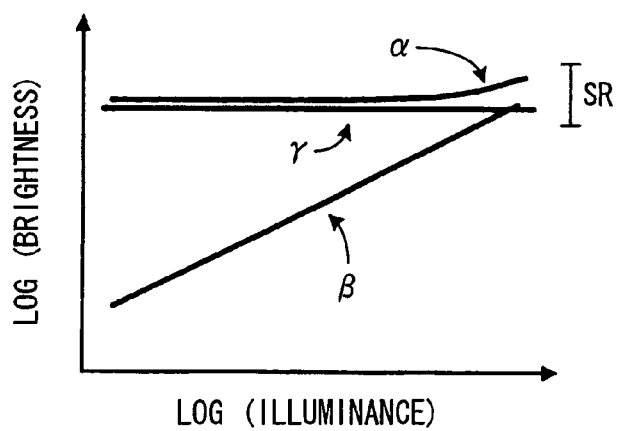
FIG. 3 is a graph showing a relationship between an illuminance of outside light and a brightness of a finger of a driver.

As shown in FIG. 3, the third curve γ has a constant brightness, because outside light does not exist. The brightness of the second curve β is increased, as the illuminance of outside light increases, due to reflection of outside light. The brightness of the first curve α corresponds to a sum of the brightnesses of the second curve β and the third curve γ. The first curve a has a constant luminance, when the illuminance of outside light is small, similarly to the third curve γ. The brightness of the first curve α is increased, as the illuminance of outside light increases. Thus, the brightness of the finger B has a small sensitivity range SR, as shown in FIG. 3.

Figure 4A:
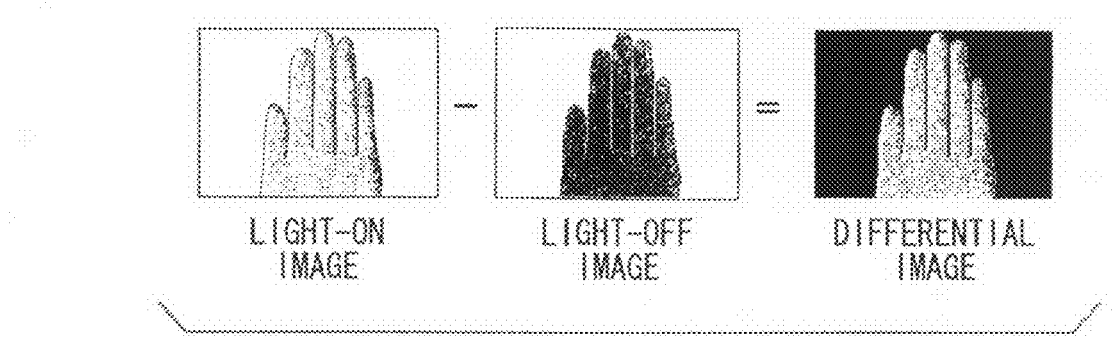
FIG. 4A is a differential image in which the illuminance of outside light is large.
Figure 4B:
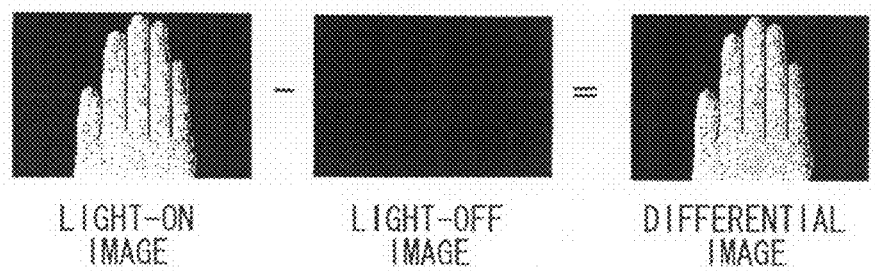
FIG. 4B is a differential image in which the illuminance of outside light is small.

Therefore, as shown in FIG. 4A, when the illuminance of outside light is large, the first image (i.e., light-on image) has a slight image of the finger B, and the second image (i.e., light-off image) has a strong image of the finger B as a shadow. Thus, the differential image of the finger B can be provided by a difference between the first and second images. In contrast, as shown in FIG. 4B, when the illuminance of outside light is small, the first image (i.e., light-on image) has a clear image of the finger B, and the second image (i.e., light-off image) has no image of the finger B. Thus, the differential image of the finger B can be provided by a difference between the first and second images.

Further, the controller 16 controls the display screen 2 to display the differential image of the finger B, which overlaps with other displays used for operating the vehicle navigation system 1. In addition, the controller 16 performs a variety of processes, e.g., route searching process, route introducing process or displaying process, for controlling the vehicle navigation system 1, other than the control of the object-detecting device 5.

When the driver A touches the operation panel 20 by the finger B, the sensor 22 is turned on. Then, the controller 16 controls the lighting portion 14 and the imaging portion 12 so as to capture the first and second images. The first and second images are stored in the image memory 18. Based on the differential image between the first and second images, the controller 16 captures the image of the finger B of the driver A. The image of the finger B of the driver A is displayed on the display screen 2, together with other displays used for operating the vehicle navigation system 1.

The imaging portion 12 is located at a palm side of the driver A. That is, the imaging portion 12 is positioned at a bottom side of the finger B of the driver A. Outside light does not fall on the bottom side of the finger B of the driver A. When outside light makes a shadow of the finger B at the palm side of the driver A, the imaging portion 12 images the shadow as the second image. When the lighting portion 14 lights the finger B from the palm side of the driver A, the imaging portion 12 captures the first image. The image of the finger B is obtained by the differential image between the first and second images.

Therefore, even when the illuminance of outside light changes, control range (e.g., sensitivity range or lens aperture range) of optical parts in the imaging portion 12 can be made narrow, because the device 5 extracts the image of the finger B based on the differential image. The change of the shadow of the finger B is small.

When the sensitivity range is made narrow, an imaging tube or an imaging element in the imaging portion 12 can be inexpensive, small and light. When the control range of the optical parts such as the lens aperture range is made narrow, the optical parts can be inexpensive, small and light. Thus, the object-detecting device 5 can be inexpensive, small and light.

Because the device 5 includes the image memory 18, the first and second images can be separately captured with a time lag between the first and second images. Therefore, the single device 5 can provide the differential image. Thus, the device 5 can be inexpensive, small and light.

Because the focus of the imaging portion 12 is spaced upward from the top face of the operation panel 20, an image captured by the imaging portion 12 has a defocus. Due to the defocus, a flaw (scratch) or a dust on the operation panel 20 is not captured as the image, because the flaw and the dust are small relative to the finger B. Thus, the device 5 can accurately extract the image of the finger B.

The imaging portion 12 captures the infrared image. The driver A cannot see infrared rays. Therefore, infrared rays do not affect a safe driving by the driver 1, even when infrared rays successively blink.

Only when the finger B is at the operation potion, the lighting portion 14 is turned on, and the imaging portion 12 captures an image. That is, when the driver A does not operate the panel 20, the imaging portion 12 and the lighting portion 14 are not actuated. Thus, consumption energy can be reduced.

The imaging portion 12 is constructed with the optical parts and the imaging elements. Therefore, the imaging portion 12 can capture a clear image, because the optical parts and the imaging elements can set an appropriate condition for taking the clear image.

Second Embodiment

The imaging portion 12 includes a low pass filter (not shown). The imaging portion 12 has a focus on a top face of the operation panel 20 in the second embodiment. When the imaging portion 12 outputs an image as an output signal, the low pass filter smoothes the output signal. That is, the low pass filter does not transmit the output signal having a frequency equal to or higher than a predetermined frequency.

Figure 5A:
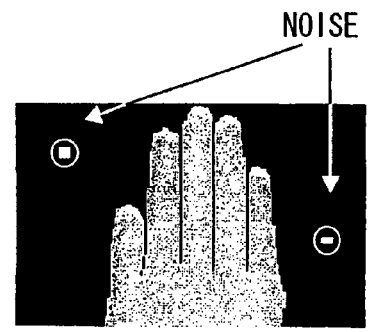
FIG. 5A is a differential image having noise.
Figure 5B:
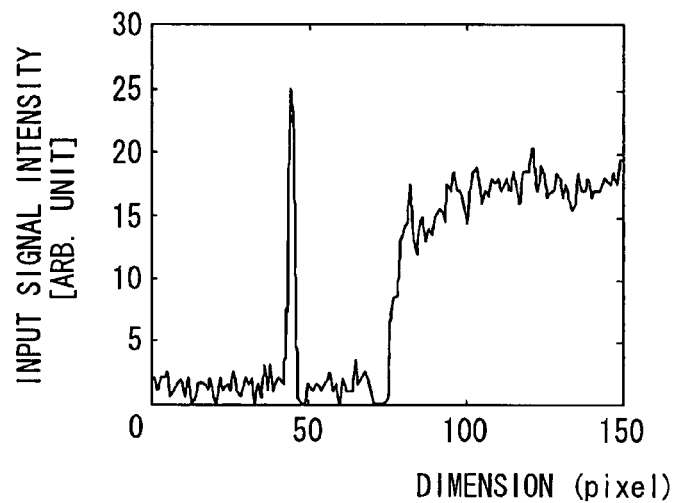
FIG. 5B is a graph showing the noise in an output signal.

Here, the predetermine frequency is set based on a characteristic of noise to be removed. For example, as shown in FIG. 5A, a scratch or a dust may be on the operation panel 20. A size of the scratch or the dust defines the predetermined frequency. When the size of the scratch or the dust is small, the predetermined frequency is made higher, because noise has a spike shape, as shown in FIG. 5B. In contrast, when the size of the scratch of the dust is large, the predetermined frequency is made lower.

Figure 5C:
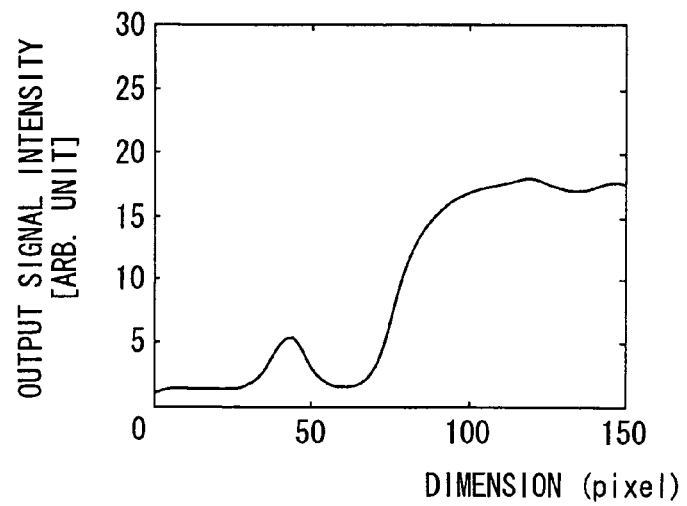
FIG. 5C is a graph in which the signal is smoothed by a filter in the device.

Due to the low pass filter, high-frequency bandwidth signal (noise) such as the scratch or the dust shown in FIG. 5B can be removed, as shown in FIG. 5C. Therefore, the output signal can be smoothed. This effect is also provided when the imaging portion 12 has the focus spaced from the top face of the operation panel 20.

Figure 6:
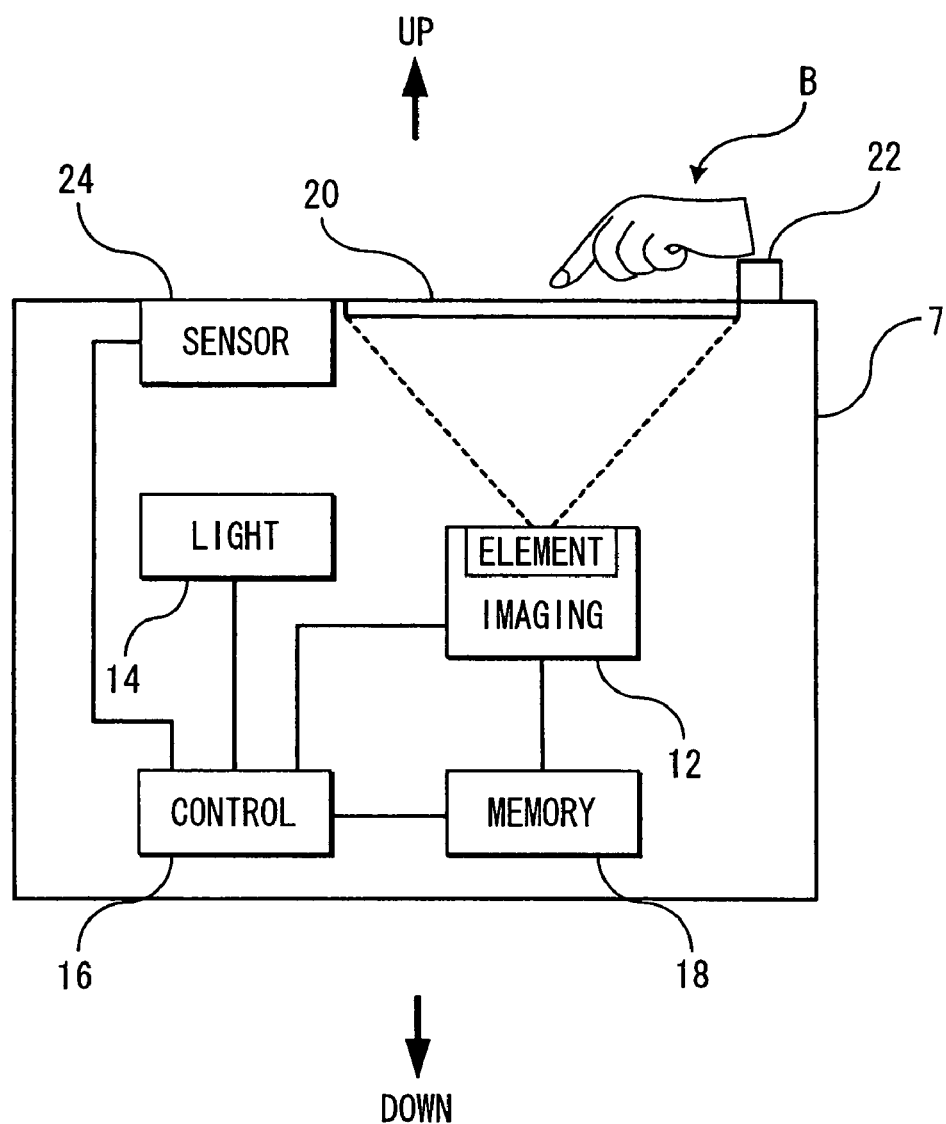
FIG. 6 is a schematic diagram showing a construction of an object-detecting device according to a second embodiment.

As shown in FIG. 6, an object-detecting device 7 includes an illuminance sensor 24 in the second embodiment. The illuminance sensor 24 detects an illuminance of outside light. For example, a photo diode or a phototransistor is used as the illuminance sensor 24.

The controller 16 controls an illuminance of the lighting portion 14 in accordance with the illuminance of outside light detected by the illuminance sensor 24. Specifically, when the illuminance of outside light is large, the illuminance of the lighting portion 14 is made small. When the illuminance of outside light is small, the illuminance of the lighting portion 14 is made large. Thus, the brightness of the bottom face of the finger B can be made constant.

When the brightness of the bottom face of the finger B is constant, a control range of the imaging portion 12 can be made narrow. Thus, the imaging portion 12 can be inexpensive, small and light. Further, when the illuminance of outside light is large, the illuminance of the lighting portion 14 can be reduced. Thus, consumption energy can be reduced.

Moreover, the controller 16 controls the lighting portion 14 to alternately have a lighting period and a non-lighting period, which are approximately equal to each other. The image memory 18 alternately stores the first image taken in the lighting period and the second image taken in the non-lighting period. The differential image is provided between the first image and the second image. Then, the next differential image is provided between the second image and the next first image. Thus, the number of the differential images can be increased.

Further, the controller 16 has a constant interval between the imaging of the first image and the imaging of the second image. In this case, if the finger B is slightly moved, the movement of the finger B in the interval may be small. Therefore, the differential image can be accurately provided.

Third Embodiment

Figure 7:
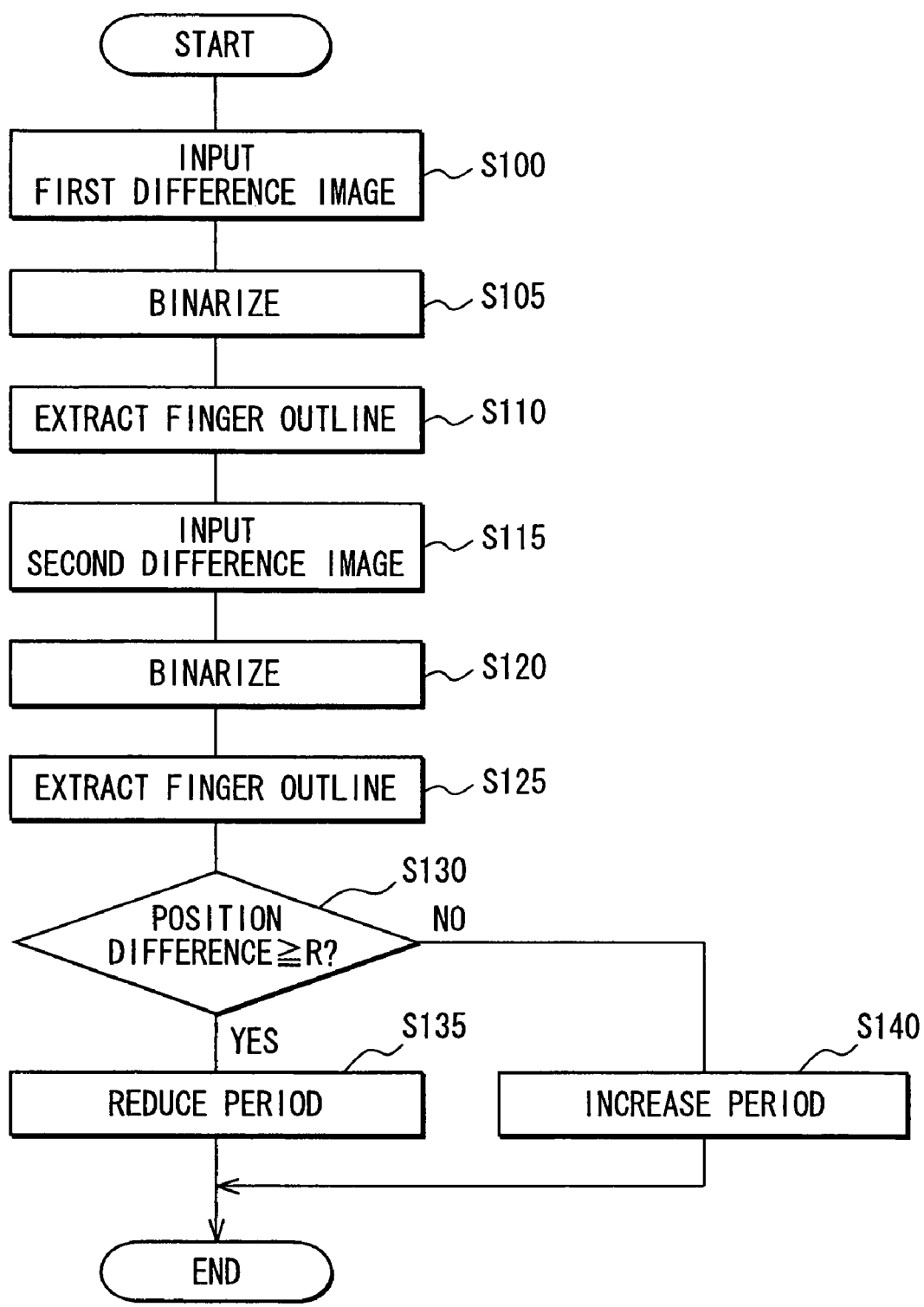
FIG. 7 is a flow chart showing a control of an object-detecting device according to a third embodiment.

FIG. 7 shows a control of the lighting portion 14 by the controller 16. A first differential image is input into the controller 16 (S100). The controller 16 binarizes the first differential image (S105). The controller 16 extracts an outline of the finger B of the driver A from the binarized first differential image (S110).

Then, a second differential image is input into the controller 16 (S115). The controller 16 binarizes the second differential image (S120). The controller 16 extracts an outline of the finger B of the driver A from the binarized second differential image (S125).

The controller 16 compares positions of the outlines extracted at S110 and S125. The controller 16 determines a position difference between the positions of the outlines is equal to or larger than a predetermined value R or not. When the position difference is equal to or larger than the predetermined value R (YES at S130), the controller 16 reduces the lighting period and the non-lighting period of the lighting portion 14 (S135). Then, the controller 16 returns to S100. When the position difference is smaller than the predetermined value R (NO at S130), the controller 16 increases the lighting period and the non-lighting period of the lighting portion 14 (S140). Then, the controller 16 returns to S100.

Thus, the movement of the finger B of the driver A is detected, and the lighting period and the non-lighting period of the lighting portion 14 are controlled based on a speed of the movement. When the movement of the finger B is fast, the lighting period and the non-lighting period of the lighting portion 14 are reduced. Therefore, the finger B can be accurately extracted, because defocus of the differential image is reduced.

Further, the controller 16 controls timing for imaging the first and second images based on the speed of the movement of the operation object.

Other Embodiments

The object-detecting device 5, 7 extracts the finger B of the driver A in the above embodiments. However, the driver A may use a touch pen, and the object-detecting device 5, 7 may extract the touch pen.

The imaging portion 12 is constructed with the light wavelength conversion element for converting infrared light into visible light, and the imaging element for imaging the visible image in the above embodiments. Alternatively, the imaging portion 12 may be constructed with an infrared camera including an imaging element for imaging an infrared image. The imaging element of the infrared camera is a semiconductor element made of InPb or HgCdTe, or a current collecting sensor, e.g., thermocouple or bolometer. Further, the imaging portion 12 may be constructed with a visible-light camera having the light wavelength conversion element and an infrared filter.

The imaging portion 12 has a focus spaced from the top face of the operation panel 20 toward the finger B (upward) in the first embodiment. Alternatively, the imaging portion 12 may have a focus spaced from the top face of the operation panel 20 toward the imaging portion 12 (downward).

The first image of the finger B is taken when the lighting portion 14 is lighting the finger B, and the second image of the finger B is taken when the lighting portion is not lighting the finger B. However, the illuminance of the lighting portion 14 may be gradually varied. The imaging portion 12 may capture images of the finger B in plural illuminance conditions. Then, images appropriate for the image processing may be selected from the images captured in the plural illuminance conditions. For example, an image having a sufficient brightness difference between the finger B and the background can be easily processed. In this case, the finger B can be easily extracted, even when illuminance variation of outside light is large. Further, control range of the optical parts can be reduced, because the illuminance conditions can be determined in advance.

The object-detecting device 5, 7 is used in the vehicle. Specifically, the device 5, 7 is used in a car, a train, a ship, a plane or with a human moving in a space.

The object-detecting device 5, 7 is used for the vehicle navigation system 1. However, the device 5, 7 may be used for a ship steering system or a flight controlling system, that is a machinery used in a mobile unit. Further, the device 5, 7 may be used for an entertainment machinery such as a head mounted display (HMD) for a human.

The controller 16 captures the image of the finger B, based on the differential image between the first image and the second image. However, the image of the finger B may be based on a quotient image between the first image and the second image. For example, the first image is divided by the second image. Further, the image of the finger B may be provided by just comparing the first image and the second image using if statement.

While the invention has been described with reference to a preferred embodiment thereof, it is to be understood that the invention is not limited to the preferred embodiment and constructions. The invention is intended to cover various modification and equivalent arrangements. The invention is intended to cover various combinations and configurations, which are preferred, other combinations and configurations, including more, less or only a single element, are also within the spirit and scope of the invention.

What is claimed is:

1. An object-detecting device for detecting an operation object, which is used for operating an operating apparatus, the device comprising:
    a detector for detecting an illuminance of outside light;
    an imaging portion for imaging the operation object; and
    an image processor for extracting the operation object, wherein
    the operation object has a first face, on which outside light falls from outside into the operating apparatus, and a second face opposite to the first face, and
    the imaging portion images the second face of the operation object,
    the image processor includes:
        a lighting portion for lighting the second face of the operation object;
        a memory for storing first and second images imaged by the imaging portion; and
        a controller for controlling an illuminance of the lighting portion and the imaging portion, wherein
    the imaging portion images the first and second images in different conditions, in which the controller changes the illuminance of the lighting portion,
    the image processor compares the first and second images so as to extract the operation object, and
    the controller controls the illuminance of the lighting portion based on the illuminance of outside light.

2. An object-detecting device for detecting an operation object, which is used for operating an operating apparatus, the device comprising:
    an imaging portion for imaging the operation object; and
    an image processor for extracting the operation object, wherein
    the operation object has a first face, on which outside light falls from outside into the operating apparatus, and a second face opposite to the first face, and
    the imaging portion images the second face of the operation object,
    the image processor includes:
        a lighting portion for lighting the second face of the operation object;
        a memory for storing first and second images imaged by the imaging portion; and
        a controller for controlling an illuminance of the lighting portion and the imaging portion, wherein
    the imaging portion images the first and second images in different conditions, in which the controller changes the illuminance of the lighting portion,
    the image processor compares the first and second images so as to extract the operation object,
    the lighting portion has a first period, for which the lighting portion is turned on, and a second period, for which the lighting portion is turned off, and
    the first period is approximately equal to the second period.

3. The object-detecting device according to claim 2, wherein
    the controller turns on and off the lighting portion,
    the imaging portion images the first image, when the lighting portion is turned on, and
    the imaging portion images the second image, when the lighting portion is turned off.

4. The object-detecting device according to claim 3, wherein
    the image processor extracts the operation object based on a differential image between the first image and the second image.

5. The object-detecting device according to claim 2, wherein
the lighting portion emits infrared light, and
the imaging portion images an infrared image.

6. The object-detecting device according to claim 2, wherein
the imaging portion is made of a plurality of optical parts and a plurality of imaging elements.

7. The object-detecting device according to claim 2, wherein
the controller has a constant interval between the imaging of the first image and the imaging of the second image.

8. The object-detecting device according to claim 2, wherein
the operating apparatus is mounted in a mobile unit.

9. An object-detecting device for detecting an operation object, which is used for operating an operating apparatus, the device comprising:
a determining portion for determining the operation object to be at an operation position,
an imaging portion for imaging the operation object; and
an image processor for extracting the operation object, wherein
the operation object has a first face, on which outside light falls from outside into the operating apparatus, and a second face opposite to the first face, and
the imaging portion images the second face of the operation object,
the image processor includes:
a lighting portion for lighting the second face of the operation object;
a memory for storing first and second images imaged by the imaging portion; and
a controller for controlling an illuminance of the lighting portion and the imaging portion, wherein
the imaging portion images the first and second images in different conditions, in which the controller changes the illuminance of the lighting portion,
the image processor compares the first and second images so as to extract the operation object,
the controller turns on the lighting portion only when the determining portion determines that the operation object is at the operation portion, and
the imaging portion images the operation object only when the determining portion determines that the operation object is at the operation portion.

10. An object-detecting device for detecting an operation object, which is used for operating an operating apparatus, the device comprising:
a detector for detecting a movement of the operation object;
an imaging portion for imaging the operation object; and
an image processor for extracting the operation object, wherein
the operation object has a first face, on which outside light falls from outside into the operating apparatus, and a second face opposite to the first face, and
the imaging portion images the second face of the operation object,
the image processor includes:
a lighting portion for lighting the second face of the operation object;
a memory for storing first and second images imaged by the imaging portion; and
a controller for controlling an illuminance of the lighting portion and the imaging portion, wherein
the imaging portion images the first and second images in different conditions, in which the controller changes the illuminance of the lighting portion,
the image processor compares the first and second images so as to extract the operation object,
the lighting portion has a first period, for which the lighting portion is turned on, and a second period, for which the lighting portion is turned off, and
the controller controls the first period and the second period based on a speed of the movement of the operation object.

11. The object-detecting device according to claim 10, wherein
the controller controls a timing for imaging the first and second images based on the speed of the movement of the operation object.

* * * * *